April 20, 1965 — T. J. WEIR — 3,179,221
FLUID COUPLING DEVICE
Filed June 7, 1961 — 3 Sheets-Sheet 1

INVENTOR.
THOMAS J. WEIR
BY
Lockwood, Woodard, Smith & Weikart
ATTORNEYS

INVENTOR.
THOMAS J. WEIR
BY
Lockwood, Woodard, Smith & Weikart
ATTORNEYS

INVENTOR.
THOMAS J. WEIR
BY
Lockwood, Woodard, Smith & Weikart
Attorneys

United States Patent Office 3,179,221
Patented Apr. 20, 1965

3,179,221
FLUID COUPLING DEVICE
Thomas J. Weir, Indianapolis, Ind., assignor to Schwitzer Corporation, Indianapolis, Ind., a corporation of Indiana
Filed June 7, 1961, Ser. No. 115,476
5 Claims. (Cl. 192—58)

This invention relates generally to fluid coupling devices, and more particularly, to a fluid coupling adapted to drive an accessory device, such as a cooling fan, from an internal combustion engine.

Automotive vehicles, such as passenger automobiles and busses, are being provided with air conditioning equipment, the condensing element of such equipment being mounted in front of the cooling radiator of the engine. The air flowing through the condensing element is heated thereby and then flows through the cooling radiator of the engine thereby effecting the cooling characteristics of the radiator. Accordingly, the size of the cooling fan and its speed of rotation have been increased to provide adequate volume of cooling air. As a result, the parasitic load on the engine has been increased and the noise of fan operation has risen to an objectionable level.

To compensate for these effects, the cooling fan of the engine is provided with a fluid coupling device having temperature responsive means controlled either by the temperature of the air flowing through the radiator or by the temperature of the water circulating through the engine cooling system. The degree of coupling between the fan and the engine is controlled by the temperature responsive means to provide direct coupling of the fan to the engine when the air or the cooling water is at relatively high temperatures and to effect a certain degree of slip within the coupling to drive the fan at lower than normal speeds when the temperature of the air or cooling water is relatively low. This temperature variable coupling has the advantage of decreasing the power supplied to the fan by the engine when less air is needed for cooling purposes. This type of variable coupling also has the advantage that fan noise is decreased when fan speed is reduced.

Conventional temperature responsive fluid coupling devices of the type described employ a temperature responsive bimetallic element operative to control valve means within the drive unit for changing the degree of coupling by permitting flow of fluid or for preventing flow of fluid within the coupling unit. Such bimetallic elements have been of spiral form mounted closely adjacent to the casing of the coupling unit. Because of this relationship, excessive heat is transmitted from the casing of the unit to the bimetallic element causing false operation of the unit whereby the degree of coupling is changed contrary to changes of cooling air temperature.

Conventional temperature responsive fluid coupling devices also have certain other disadvantages. For example, certain types include spiral bimetallic thermostats wherein the amount of angular or rotational movement per degree of temperature change depends upon the length of the material in the bimetallic element, this length determining the number of coils in the element. Thus, it is necessary to use precision methods of manufacture so that the bimetallic element will have the desired degree of angular movement per degree of temperature change. Whenever it is necessary to manufacture a device to close tolerances, expense increases accordingly.

The spiral bimetallic element is utilized to rotate a valve member comprising an arm which moves angularly at a uniform rate to open and close a circular port. The port is usually located at the free end of the valve member, and when a circular port is used, the degree of opening is not uniform for each degree of temperature change. As a result, initial movement of the valve permits insufficient flow of fluid to change the degree of coupling in proportion to the temperature change. Similarly, further opening of the valve permits an excessive flow of fluid and an excessive change in the degree of coupling per degree of temperature change, thereby to cause an excessive degree of coupling and to fully modulate the coupling device from minimum to maximum transmission of torque. Obviously, the simplest form of port from the manufacturing standpoint is a circular one, but in order to correct the disproportionate change in coupling, it would be necessary to provide a port having a complex shape such that there would be uniform change in flow of fluid per degree of temperature change.

Conventional fluid coupling units are also unsatisfactory because of excessive heating of the fluid therein. Such excessive heating changes the viscosity of the fluid and the degree of coupling within the unit. Conventional units are also relatively complex, unnecessarily large in size and unduly expensive. In particular, the spiral type of bimetallic element requires excessive space between the radiator and the fan where space is at a premium.

The principal object of this invention is to provide in a fluid coupling unit a temperature responsive means adapted to provide uniform control of said coupling unit over a relatively wide range of temperature.

Another object of this invention is to provide a fluid coupling unit for automotive accessory devices, such as fans, wherein the temperature responsive control member is not materially affected by the temperature of the unit itself but is responsive primarily to the temperature of the air flowing around it.

Another object of this invention is to provide in a fluid coupling unit a temperature responsive control means to cause the maximum amount of fluid to be exposed to the outside surfaces for most efficient cooling of the fluid.

Still another object of this invention is to provide in a fluid coupling unit a temperature responsive control means and a valve mechanism cooperating therewith wherein a relatively small movement of said control means provides a relatively large degree of movement of the valve mechanism.

A further object of this invention is to provide, in a fluid coupling unit, means adapted to cause circulation of the fluid and more uniform temperature of the fluid throughout the interior of said unit.

A still further object of the invention is to provide a fluid coupling unit of relatively small size and simple, inexpensive construction.

A still further object of the invention is to provide in a fluid coupling unit a bimetallic temperature responsive control element which requires less space and uses less bimetallic material.

In accordance with this invention there is provided a fluid coupling element comprising a casing having a fluid reservoir therein and a fluid chamber for accommodating a driven disc, the casing being adapted to support a fan or to be coupled to any desired form of accessory device, a valve mechanism operable to control flow of fluid between said reservoir and said chamber, and a bimetallic element in the form of a ribbon supported on the exterior of said casing and coupled to said valve for controlling the opening and closing thereof, thereby to control the amount of fluid within said chamber and the degree of coupling between said disc and said casing in response to variation of air temperature.

The full nature of the invention will be understood from the accompanying drawing and the following description and claims:

Figure 1:
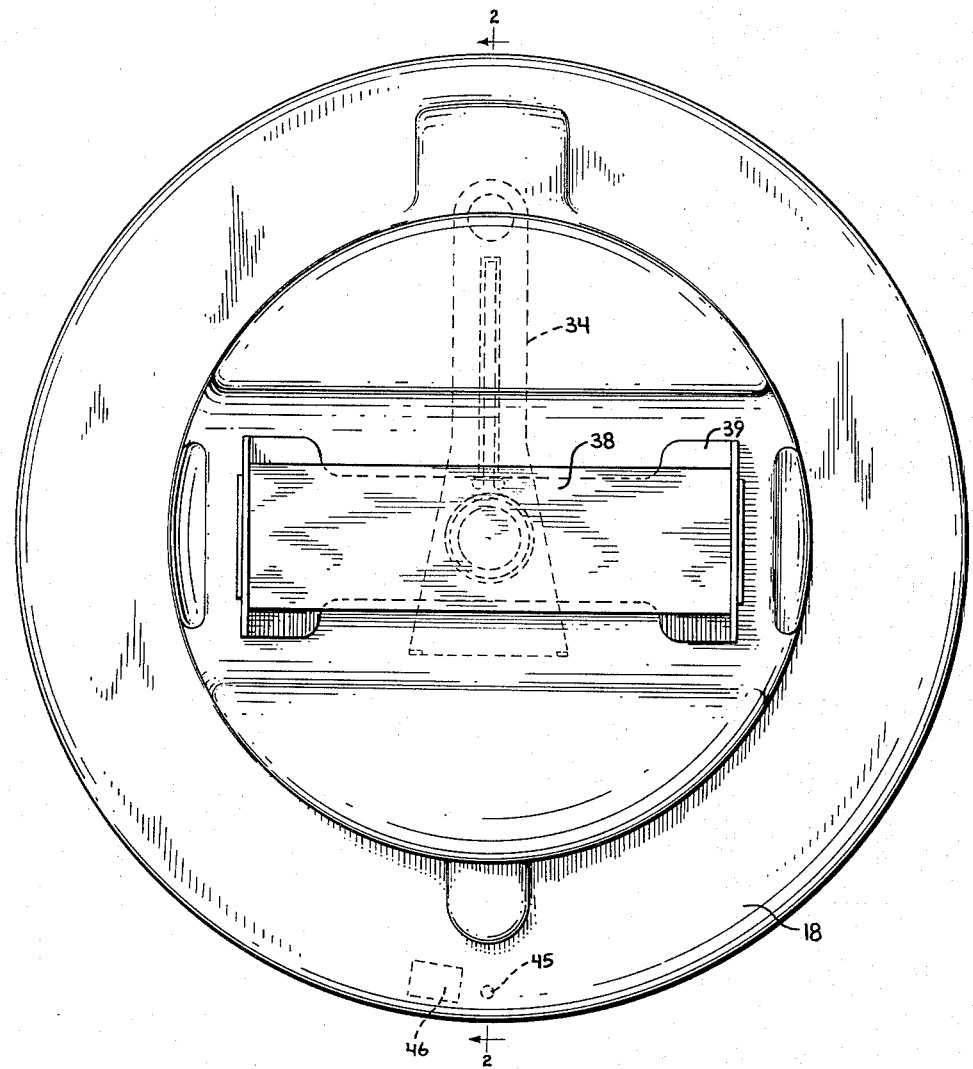
FIG. 1 is a front elevation, with parts broken away, of the fluid drive coupling device embodying this invention.

This invention comprises a fluid coupling unit comprising a casing member 10 having a hub 11 for rotatably mounting the casing on a drive shaft 12, there being a conventional sealed bearing assembly 14 for supporting the casing on the shaft. Shaft 12 may be integrally connected with a coupling flange 15 for coupling the drive shaft 12 to any convenient rotating part of an internal combustion engine. If the coupling unit is utilized for driving a cooling fan, the blades of the fan may be bolted to casing 10 by means of bolts threadedly engaging a plurality of radially disposed threaded bores 16 and the member 15 may be connected to the pulley which conventionally drives the engine water pump.

Casing 10 may be provided with a cover member 18, the peripheral edges of which engage the peripheral edges of a plate 19 seated on an annular surface 20 formed adjacent the periphery of casing 10. Cover member 18 and plate 19 may be clamped to casing member 10 by means of an annular flange member 21 swaged or otherwise formed into pressure engagement with the outer peripheral surface of cover 18. Cover 18 is formed and disposed to have spaced relation in respect to plate 19 thereby to provide a fluid reservoir 23 between cover 18 and plate 19. Casing 10 is formed to provide a recess inwardly of plate 19 thereby to provide a drive chamber 24 within which is mounted the drive disc 26. Shaft 12 carries disc 26 which may be press-fitted or otherwise fixed to the end of shaft 12 whereby rotation of shaft 12 causes disc 26 to rotate within chamber 24. The peripheral portions of disc 26 are covered with arcuate facing members 28 which may be spaced from one another to provide grooves or channels 30 extending between the extreme outer edge of disc 26 and inwardly the entire width of the facing members 28. Grooves 30 provide toroidal circulation of fluid because of the provision of ports 32 located at the inner ends of each one of the grooves 30. This means of providing toroidal circulation of fluid is fully described in my United States Letters Patent No. 2,879,755 granted March 31, 1959.

For controlling flow of fluid from reservoir 23 into chamber 24 there is provided an elongated valve member 34 extending at its outer end over a port 35 in the plate 19 and at its other end having finger members 36 seated in apertures 36a in plate 19. The finger members provide a pivot for valve 34 which is disposed 180° from the port 35 and on the opposite side of the center line of the shaft 12 in respect to port 35. For controlling the operation of valve member 34 there is provided a bimetallic ribbon member 38 mounted at its ends in spaced relation to a racket 39 which, in turn, is mounted on the cover 18. For operatively coupling bimetallic member 38 to valve 34 there is provided a button member 42 abutting bimetallic member 38 at one end and engaging valve member 34 at the other end. Valve 34 includes a finger spring member 34a formed normally to engage plate 19 for biasing valve 34 toward an open position. In a relatively cold condition, bimetallic member 38 presses on button 42 forcing it into engagement with valve 34 holding it in closed relation to port 35 against the biasing action of spring 34a. Fingers 36 center valve 34 preventing angular movement thereof whereby the movement of valve 34 is limited solely by bimetallic member 38. For preventing flow of fluid around button 42 there is provided a conventional sealing ring 43 nested within a groove in button 42 as illustrated.

For providing flow of fluid out of the chamber 24 there is an aperture 45 in plate 19 adjacent the periphery thereof and opening into reservoir 23 and chamber 24. Thus, fluid may flow from reservoir 23 through port 35 into chamber 24 and from chamber 24 through port 45 into reservoir 23. In order to force flow of fluid through port 45, plate 19 is formed to provide a projecting surface 46 located immediately adjacent to port 45 and projecting into chamber 24 into close proximity to the peripheral surface of disc 26. It will be noted that the facing members 28, which are opposite to the inner surface of plate 19, do not extend all the way to the circumferential edge of disc 26 leaving a space opposite the projection 46. Thus, centrifugal force causes fluid to collect in this space in front of projection 46 creating pressure sufficient to force flow of fluid through port 45.

Figure 5:
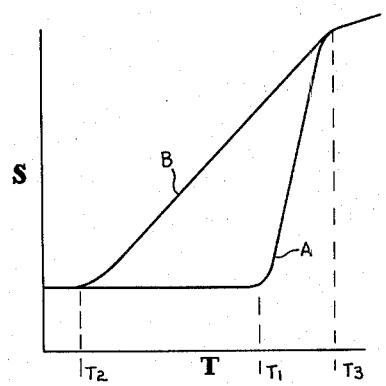
FIG. 5 is a graph illustrating the performance characteristic of the bimetallic control element provided in accordance with this invention.
Figure 6:
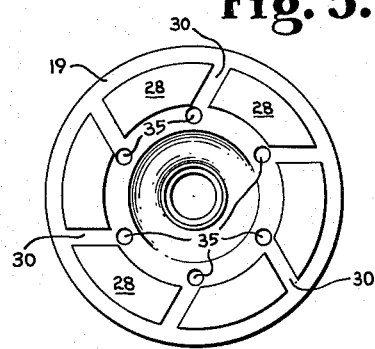
FIG. 6 is a side elevation in reduced scale of the drive disc 26 taken from the lefthand side of FIG. 2.
Figure 7:
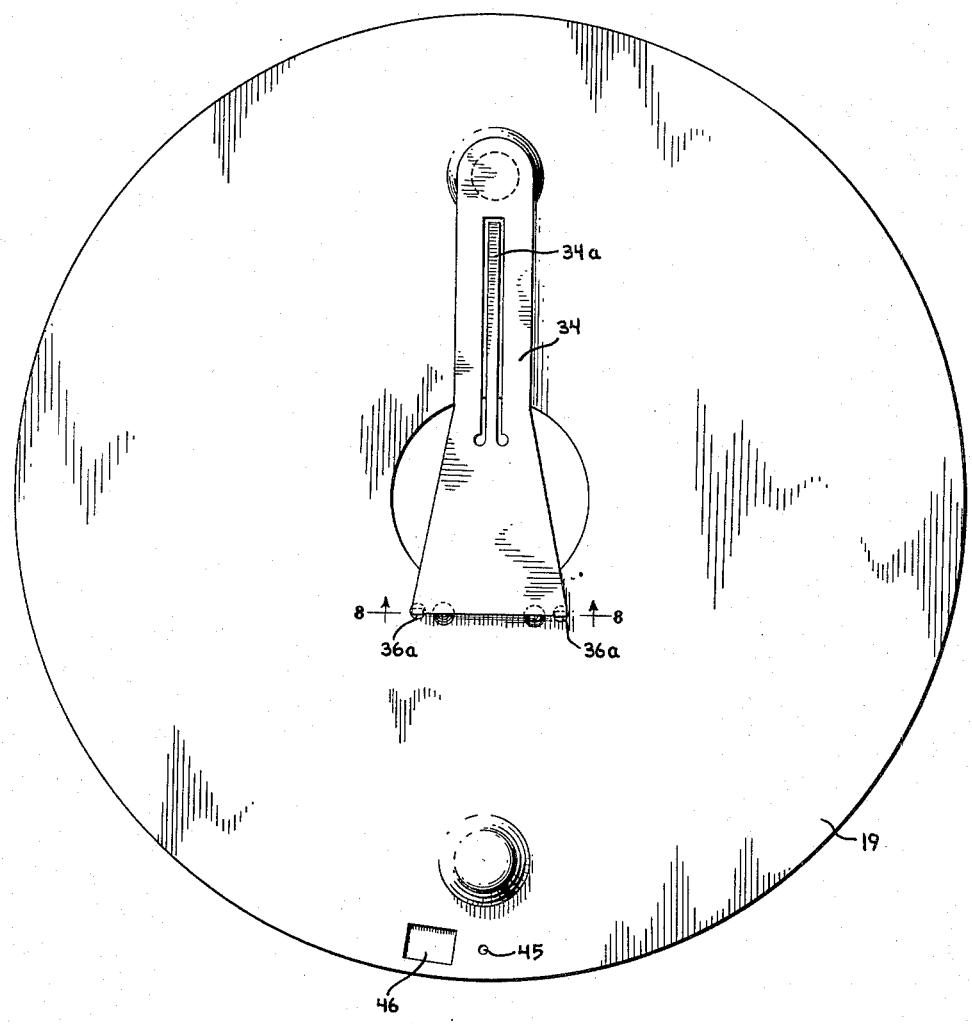
FIG. 7 is a side elevation taken from the left of FIG. 2 and illustrating the valve structure shown therein.
Figure 8:
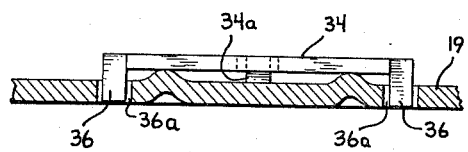
FIG. 8 is a cross section taken on line 8—8 of FIG. 7.

FIG. 5 of the drawing illustrates by a graph the performance characteristics of a spiral bimetallic element and a bimetallic element in the form of a flat plate. For example, curve A shows the degree of movement of a spiral bimetallic element where the abscissa is temperature and the ordinate is distance moved. Curve A shows there is substantially no change in coupling speed until a relatively large temperature $T_1$ is reached after which the coupling speed changes at a relatively high rate with change of temperature. Curve B illustrates that a bimetallic element in the form of a plate responds at a relatively low temperature $T_2$ to increase coupling speed at a uniform rate until a high temperature of $T_3$ is reached. Consequently, the bimetallic element 38 provides control characteristics illustrated by curve B and provides uniform increase in speed over a relatively long temperature range.

In operation, reservoir 23 may be filled with a fluid such, for example, as an oil, to a degree sufficient to fill the spaces in chamber 24 between the opposing surfaces of the facings 28 and 51 and the adjacent walls of plate 19 and casing 10. If it is assumed that an engine is running at relatively high speed and movement of the vehicle is creating sufficient flow of air through the cooling radiator to operate the engine at its normal temperature, then the bimetallic element 38 forces valve 34 into closed position over the port 35 preventing flow of oil from reservoir 23 into chamber 24. Any oil within chamber 24 would have accumulated in the peripheral portion of chamber 24 and flowed through port 45 into reservoir 23. There being no substantial amount of oil in chamber 24 there is substantially no coupling from the drive shaft 12 through disc 26 and to the casing 10. Thus the accessory, such as a fan, attached to casing 10 revolves at very low speed. This eliminates the noise of the fan and materially reduces the accessory load on the vehicle engine.

When the vehicle is operating at high temperatures and the motion of the vehicle cannot create necessary flow of cooling air, the air temperature rises and the temperature of the engine and its cooling fluid may tend to rise, thereby further raising the temperature of the air flowing through the vehicle radiator and into contact with the bimetallic element 38. This causes the bimetallic element to flex outwardly to a degree approximately proportionate to the increase in air temperature. The pressure on the button 42 and on the valve 34 is relieved whereby the valve is opened by spring finger 34a. The oil within reservoir 23 is accumulated by the effects of centrifugal force in the peripheral portion of reservoir 23 and the inner radius of the oil in chamber 23 is less than the radius of the port 35. As the bimetallic element relieves pressure on valve 34, the oil being below the port 35, centrifugal force will cause the oil to flow through port 35 into chamber 24. Centrifugal forces cause oil entering chamber 24 to flow outwardly between the facing members 28 and 51 and the adjacent walls of chamber 24. The presence of oil in these spaces creates a coupling effect between disc 26 and casing 10 whereby the shaft 12 rotates the casing and the attached fan. A certain amount of oil will flow from chamber 24 back into the reservoir through port 45, but this amount is much less than the amount flowing through the much larger port 35 and, therefore, an adequate supply of oil remains in chamber 24 to effect the coupling function.

It will readily be apparent that a relatively small increase of air temperature will cause relatively small bending of bimetallic element 38, thus allowing a relatively small flow of oil through port 35 and creating a relatively small degree of coupling between the drive disc and the casing. Whenever the air temperature increases by a substantial degree as, for example, on a warm day when the vehicle stops and the engine idles, the bimetallic element will flex to a much greater degree allowing a greater flow of oil through port 35 and creating a much greater degree of coupling between the drive disc and the casing. Thus, there is much less slippage between the drive disc and the casing, and the relative speed of the fan with respect to the speed of the drive shaft increases to a substantial extent and may even be equal to the speed of rotation of the drive shaft.

After the engine has gone through an idling period and is speeded up to a higher driving speed, the temperature of the cooling air flowing through the radiator will decrease. This causes the bimetallic element to tend to assume its unflexed position closing the valve 34 and permitting the amount of oil in chamber 24 to decrease by reason of flow into the reservoir 23 through the port 45. This decreases the coupling between the driving disc and the casing causing the fan speed to decrease.

Figure 2:
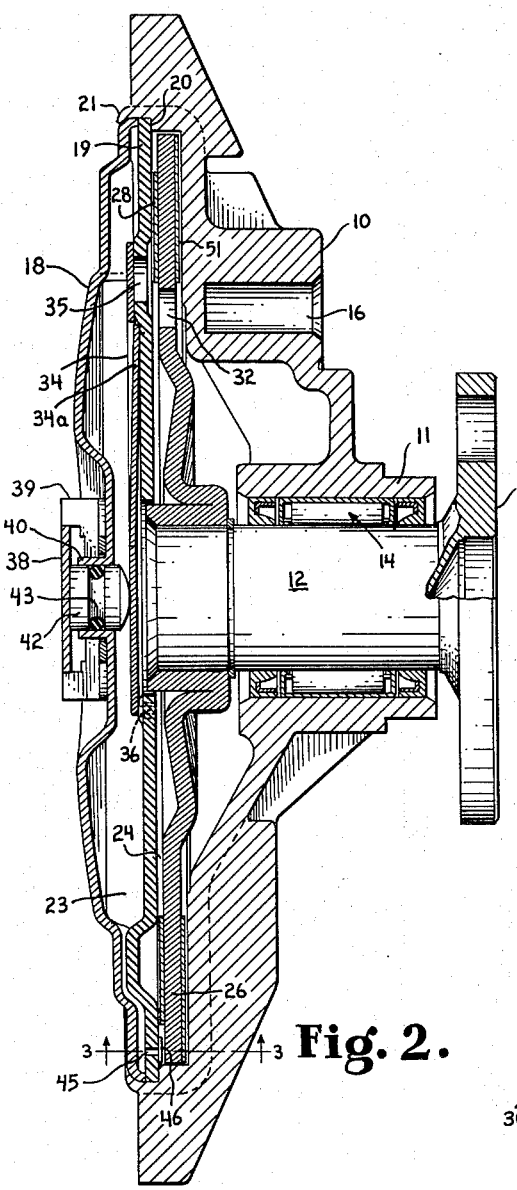
FIG. 2 is a cross section taken on line 2—2 of FIG. 1.
Figures 3, 4:
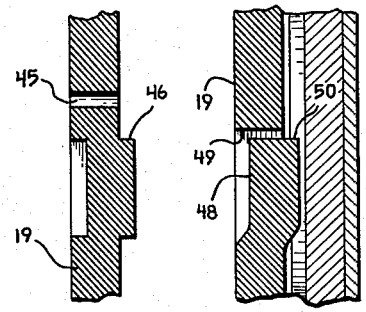
FIG. 3 is a partial cross section taken on line 3—3 of FIG. 2.
FIG. 4 illustrates a modification of the structure shown in FIG. 3 and is a cross section taken on line 3—3 of FIG. 2 of a modified form of the divider plate illustrated therein.

FIG. 4 illustrates a modified structure for permitting flow of oil out of the chamber 24 into reservoir 23. Instead of having a port 45 in the plate 19 and a struck-out portion 46 therein, the plate 19 may be cut and bent as illustrated to provide a deflected portion 48 which creates a port 49 and a projecting surface 50. It will be understood that the bent portion 48 protrudes into the same peripheral space as does the projection 46 in FIG. 2. In operation, oil collects at surface 50 and is forced through aperture 49 into the reservoir 23.

From the foregoing description it is apparent that this invention provides a fluid coupling unit having a temperature responsive bimetallic element adapted to provide uniform control of the coupling unit over a relatively wide range of temperature. This is due to the fact that the bimetallic element 38 is in the form of a ribbon or plate instead of in the conventional form of a spiral. The movement of the bimetallic plate is linear rather than angular and is proportional to change of temperature and hence provides uniform control.

The bimetallic element in the form of a plate or ribbon also requires the use of less material than is necessary in a spiral form of element, and since this material is quite expensive there is a substantial saving by adapting this type of bimetallic element. Also, the space requirements of the plate form of bimetallic elements are much less than those of the spiral form of element, because a spiral element necessarily would project outwardly in front of the casing to a greater distance.

A further advantage of the plate type of bimetallic element is that it can be spaced farther outwardly of the coupling unit whereby there is less heat transfer from the unit to the bimetallic element. This prevents faulty operation of the bimetallic element since it responds more completely to air from the vehicle radiator and has less tendency to respond to heat transferred from the coupling unit.

Still another advantage of the plate type of bimetallic element results from the fact that it can be arranged to move outwardly and inwardly of the coupling unit in response to changes of temperature. This creates reciprocating motion of the valve instead of rotary motion as would be the case if a spiral bimetallic element were used. As will be apparent from the drawings the valve member 34 is relatively long while the button 42 engages the valve member closely adjacent to one end thereof. Thus, relatively slight movement of the bimetallic element and the button permits movement to a multiplied degree at the outer end of member 34 which serves to open and close port 35.

While this invention has been described as applicable for driving a fan in an automotive vehicle it will be readily understood that the coupling unit as provided herein is adaptable for driving any sort of device where it is desirable to vary the speed of the device in response to changes of temperature.

The invention claimed is:

1. A fluid coupling device comprising a shaft, an outer casing rotatably mounted on said shaft, said casing having as a part thereof a wall therein separating the space within said casing into a fluid reservoir and a drive chamber, a drive member mounted on said shaft within said drive chamber, a relatively large fill port in said wall opening into said reservoir and into said drive chamber for filling the spaces between said drive member and casing surfaces with fluid from said reservoir to create fluid drive coupling of said casing and said drive member, a valve plate having a free end normally closing said port, means for pivotally mounting the other end of said valve plate to a portion of said casing, a thermostat mounted on the exterior of said casing for movement axially and outwardly thereof in response to increase of temperature, a link connecting said thermostat with said valve plate adjacent the pivotal mounting means normally to hold said free end in closed position over said fill port, and to release said free end in response to outward movement of said thermostat to allow flow of fluid from said reservoir to said chamber, said wall having formed therein a relatively small drain port adjacent the disc periphery for draining fluid from said drive chamber to said reservoir and means adjacent said port in close proximity to said disc for collecting fluid and creating pressure over said second port and flow of fluid from said chamber into said reservoir.

2. A fluid coupling device comprising a shaft, an outer casing rotatably mounted on said shaft, said casing having a wall therein separating the space within said casing into a fluid reservoir and a drive chamber, a disc mounted on said shaft within said drive chamber, a fill port in said wall opening into said reservoir and into said drive chamber for filling the spaces between said disc and casing surfaces with fluid from said reservoir to create fluid drive coupling of said casing and said disc, a valve plate having a free end normally closing said port, means for mounting the other end of said valve plate to a portion of said casing, a thermostat mounted on said casing for movement axially and outwardly thereof in response to increase of temperature, and means for coupling said thermostat with said valve plate adjacent the mounting means normally to hold said free end in closed position over said fill port, and to release said free end in response to outward movement of said thermostat to allow flow of fluid from said reservoir to said chamber, said wall having means for draining fluid from said drive chamber to said reservoir.

3. A fluid coupling device comprising a shaft, an outer casing rotatably mounted on said shaft, said casing including a wall forming a fluid reservoir and a drive chamber, a drive member mounted on said shaft within said drive chamber, said wall being formed to provide a fill port opening into said reservoir and into said drive chamber for admitting fluid from said reservoir to said chamber to create fluid drive coupling of said casing and said member, a valve plate pivotally mounted on a portion of said casing, said valve plate including means engaging a portion of said casing for biasing said valve plate to open position relative to said port, and a bimetallic plate mounted on said casing for movement axially relative thereto in response to increase of temperature, and means for coupling said bimetallic plate with said valve plate normally to hold it in closed position over said fill port, and to release said valve plate in response to axial movement of said bimetallic plate to allow flow of fluid from said reservoir to said chamber, said wall having means for draining fluid from said drive chamber to said reservoir.

4. A fluid coupling device comprising a shaft, an outer casing rotatably mounted on said shaft, said casing including as a part thereof a wall therein separating the space within said casing into a fluid reservoir and a drive chamber, a drive member mounted on said shaft within said drive chamber, a relatively large fill port in said wall opening into said reservoir and into said drive chamber for filling the spaces between said drive member and casing surfaces with fluid from said reservoir to create fluid drive coupling of said casing and said drive member, a valve plate having a free end normally closing said port, means for pivotally mounting the other end of said valve plate to a portion of said casing, a thermostat mounted on the exterior of said casing for movement axially and outwardly thereof in response to increase of temperature, a link connecting said thermostat with said valve plate adjacent the pivotal mounting means normally to hold said free end in closed position over said fill port, and to release said free end in response to outward movement of said thermostat to allow flow of fluid from said reservoir to said chamber, and means in said wall for draining fluid from said drive chamber to said reservoir.

5. A fluid coupling device comprising a shaft, an outer casing rotatably mounted on said shaft, said casing including a wall forming a fluid reservoir and a drive chamber, a drive member mounted on said shaft within said drive chamber, said wall being formed to provide a fill port opening into said reservoir and into said drive chamber for admitting fluid from said reservoir to said chamber to create fluid drive coupling of said casing and said member, a valve plate pivotally mounted on a portion of said casing, said valve plate including means engaging a portion of said casing for biasing said valve plate to open position relative to said port, and a bimetallic plate mounted on the exterior of said casing with the expansion side of said plate facing outwardly relative to said casing whereby increase of temperature moves said plate axially outwardly relative to said casing, means coupling said bimetallic plate with said valve plate normally to hold it in closed position over said fill port and to release said valve plate in response to axial movement of said bimetalic plate to allow flow of fluid from said reservoir to said chamber, said wall having means for draining fluid from said drive chamber to said reservoir.

References Cited by the Examiner
UNITED STATES PATENTS

| | | |
|---|---|---|
| 1,598,677 | 9/26 | Donning et al. |
| 2,381,567 | 8/45 | Bonham. |
| 2,551,249 | 5/51 | Dickens _____ 192—61 |
| 2,675,899 | 4/54 | Bonham. |
| 2,777,303 | 1/57 | Slattery _____ 236—93 X |
| 2,902,127 | 9/59 | Hardy. |
| 3,055,473 | 9/62 | Oldberg et al. _____ 192—58 |

DAVID J. WILLIAMOWSKY, *Primary Examiner.*

THOMAS J. HICKEY, ROBERT C. RIORDON,
*Examiners.*